United States Patent
Wachi

(10) Patent No.: US 10,735,655 B2
(45) Date of Patent: Aug. 4, 2020

(54) APPARATUS, METHOD, AND PROGRAM FOR IMAGE PROCESSING

(71) Applicant: CANON KABUSHIKI KAISHA, Tokyo (JP)

(72) Inventor: Fumihito Wachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/208,393

(22) Filed: Dec. 3, 2018

(65) Prior Publication Data

US 2019/0182427 A1 Jun. 13, 2019

(30) Foreign Application Priority Data

Dec. 7, 2017 (JP) .................................. 2017-234938
Oct. 31, 2018 (JP) .................................. 2018-205359

(51) Int. Cl.
*H04N 5/232* (2006.01)

(52) U.S. Cl.
CPC ..... *H04N 5/23267* (2013.01); *H04N 5/23209* (2013.01); *H04N 5/23258* (2013.01); *H04N 5/23287* (2013.01)

(58) Field of Classification Search
CPC .......................... H04N 5/2328; H04N 5/23274

USPC ...................................................... 348/208.5
See application file for complete search history.

(56) References Cited

U.S. PATENT DOCUMENTS

2011/0129166 A1\* 6/2011 Nishiyama .............. G06T 5/003
382/263
2014/0002679 A1\* 1/2014 Ikeda ................. H04N 5/23264
348/208.5

FOREIGN PATENT DOCUMENTS

JP 2010-004370 A 1/2010
JP 2016-045488 A 4/2016

\* cited by examiner

*Primary Examiner* — Joel W Fosselman
(74) *Attorney, Agent, or Firm* — Canon U.S.A., Inc. IP Division

(57) ABSTRACT

An image processing circuit obtains filter information individually corresponding to two or more types of image stabilization processing used in shooting and performs predetermined computational processing based on the filter information individually corresponding to the two or more types of image stabilization processing to create a correction filter for use in correcting a captured image. Then, the image processing circuit performs correction processing using the created correction filter on the captured image captured using the two or more types of image stabilization processing.

17 Claims, 6 Drawing Sheets

Fn < Th1

Th1 ≤ Fn < Th2

Th2 ≤ Fn

APPARATUS, METHOD, AND PROGRAM FOR IMAGE PROCESSING

BACKGROUND OF THE INVENTION

Field of the Invention

The present disclosure relates to a technique for processing images captured using image stabilization processing.

Description of the Related Art

During shooting using an image capturing apparatus, if hand shake or the shake of the image capturing apparatus main body occurs, the resolution and the clarity of the captured image can be decreased due to an image blur phenomenon in which an object image or the like blurs on the imaging plane. Examples of a known technique for reducing or eliminating such an image blur phenomenon include optical image stabilization and electronic image stabilization. A known configuration for optical image stabilization is a configuration that reduces an image blur by inhibiting an object image or the like from moving on the imaging plane by moving an image stabilizing lens unit constituting the whole or part of the imaging optical system in a direction perpendicular to the optical axis of the imaging optical system according to the shake of the image capturing apparatus. Another configuration for optical image stabilization is a configuration that reduces the relative movement of an object image or the like with respect to the imaging plane by shifting the image sensor in the direction perpendicular to the optical axis of the imaging optical system or rolling the image sensor about the optical axis according to the shake of the image capturing apparatus. In electronic image stabilization, an image blur is falsely corrected by changing the cutting range of the captured image according to the shake of the image capturing apparatus main body or the like. Only one of the image stabilization processes has been performed in the related art. However, a technique for achieving high-accuracy image stabilization to provide a higher image stabilization effect by executing a plurality of image stabilization processes at the same time has been proposed in recent years.

Another element that degrades the captured image, other than the image blur, is diffraction due to the aberration of the lens, the aperture, or the like. An example of a technique for reducing the degradation of captured images due to the image blur and aberration, described above, is disclosed in Japanese Patent Laid-Open No. 2016-045488, in which image stabilization and correction of astigmatism and the curvature of field are achieved by moving part of the imaging optical system in a direction different from the optical axis. Japanese Patent Laid-Open No. 2016-045488 discloses a configuration including a first correcting lens that optically corrects an image blur by moving in a direction different from the optical axis and a second correcting lens that corrects aberration that has occurred when the first correcting lens is moved in the direction different from the optical axis. In another example, Japanese Patent Laid-Open No. 2010-4370 discloses a technique for selecting a method for image stabilization depending on the frequency of the shake during image stabilization using cooperative control of optical image stabilization and electronic image stabilization. Japanese Patent Laid-Open No. 2010-4370 discloses a configuration for optical image stabilization and electronic image stabilization in which a high-frequency blur component is corrected using optical image stabilization, and a low-frequency blur component is corrected using electronic image stabilization.

For example, when part of the optical system is moved by image stabilization processing, spherical aberration and coma aberration change in addition to the astigmatism and the field curvature. However, in the technique disclosed in Japanese Patent Laid-Open No. 2016-045488, the spherical aberration and coma aberration and the influence of diffraction are not corrected. In the technique disclosed in Japanese Patent Laid-Open No. 2010-4370, image stabilization processing according to the frequency of the shake during image stabilization is performed, but image degradation caused by aberration or diffraction during optical image stabilization is not corrected. Furthermore, for example, when a plurality of image stabilization processes are performed at the same time, image degradation due to a combination of aberrations that occur in the plurality of image stabilization processes has to be considered. However, the techniques disclosed in Japanese Patent Laid-Open No. 2016-045488 and Japanese Patent Laid-Open No. 2010-4370 cannot correct the degradation. For example, data on the optical characteristics of the imaging optical system and so on may be prepared in advance, and the degradation may be corrected by image processing using the data. However, this results in an enormous amount of data prepared for all possible shakes, aberrations, and so on.

SUMMARY OF THE INVENTION

The present disclosure provides an apparatus for image processing including an acquisition unit configured to obtain filter information individually corresponding to two or more types of image stabilization processing used in shooting, a creation unit configured to create a correction filter for use in correcting a captured image by performing predetermined computational processing based on the obtained filter information corresponding to the two or more types of image stabilization processing, and a processing unit configured to perform correction processing using the created correction filter on the captured image captured using the two or more types of image stabilization processing.

Further features of the present invention will become apparent from the following description of exemplary embodiments with reference to the attached drawings.

DESCRIPTION OF THE EMBODIMENTS

An embodiment of the present disclosure will be described in detail hereinbelow with reference to the drawings.

The detailed configuration and operation of an image capturing apparatus, which is an application example of an image processing apparatus according the present embodiment, will be described.

The image capturing apparatus of the present embodiment has a configuration for the image stabilization processing described above to reduce an image blur due to hand shake or the shake of the image capturing apparatus main body. The present embodiment is an example in which a high image stabilization effect and high-accuracy image stabilization are achieved by performing two or more types of a plurality of image stabilization processes at the same time. In the present embodiment, examples of the two or more types of image stabilization processes include an image stabilization process for moving an image stabilizing lens group in a direction perpendicular to the optical axis of the imaging optical system and an image stabilization process for shifting an image sensor in a direction perpendicular to the optical axis of the imaging optical system or rolling the image sensor about the optical axis. In the following description, the optical image stabilization performed by shifting the image stabilizing lens is referred to as lens stabilization, and optical image stabilization performed by shifting or rolling the image sensor is referred to as imager stabilization. In the present embodiment, the shake of the image capturing apparatus or the like is detected by a blur detecting sensor, such as an angular velocity sensor and a vibration gyroscope, provided in the image capturing apparatus. The image capturing apparatus reduces an image blur by performing image stabilization processing using lens stabilization and imager stabilization based on a blur detection signal output from the blur detecting sensor.

Figure 1A:
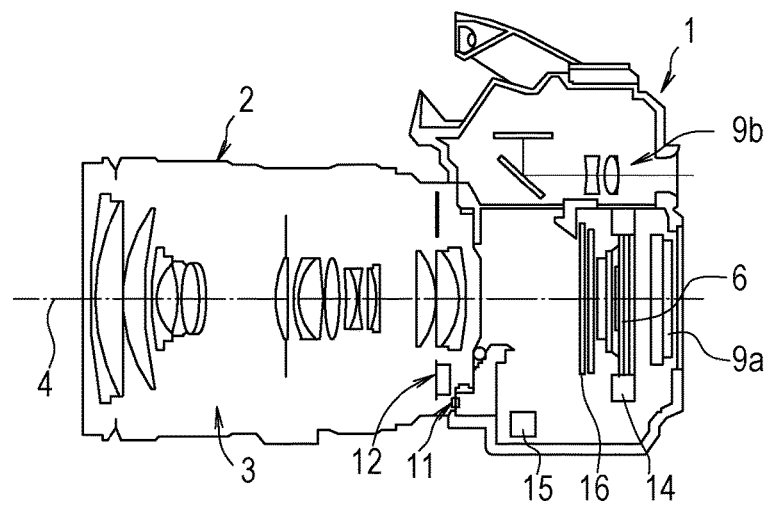
FIG. 1A is a central cross-sectional view of an image capturing apparatus according to an embodiment of the present disclosure.
Figure 1B:
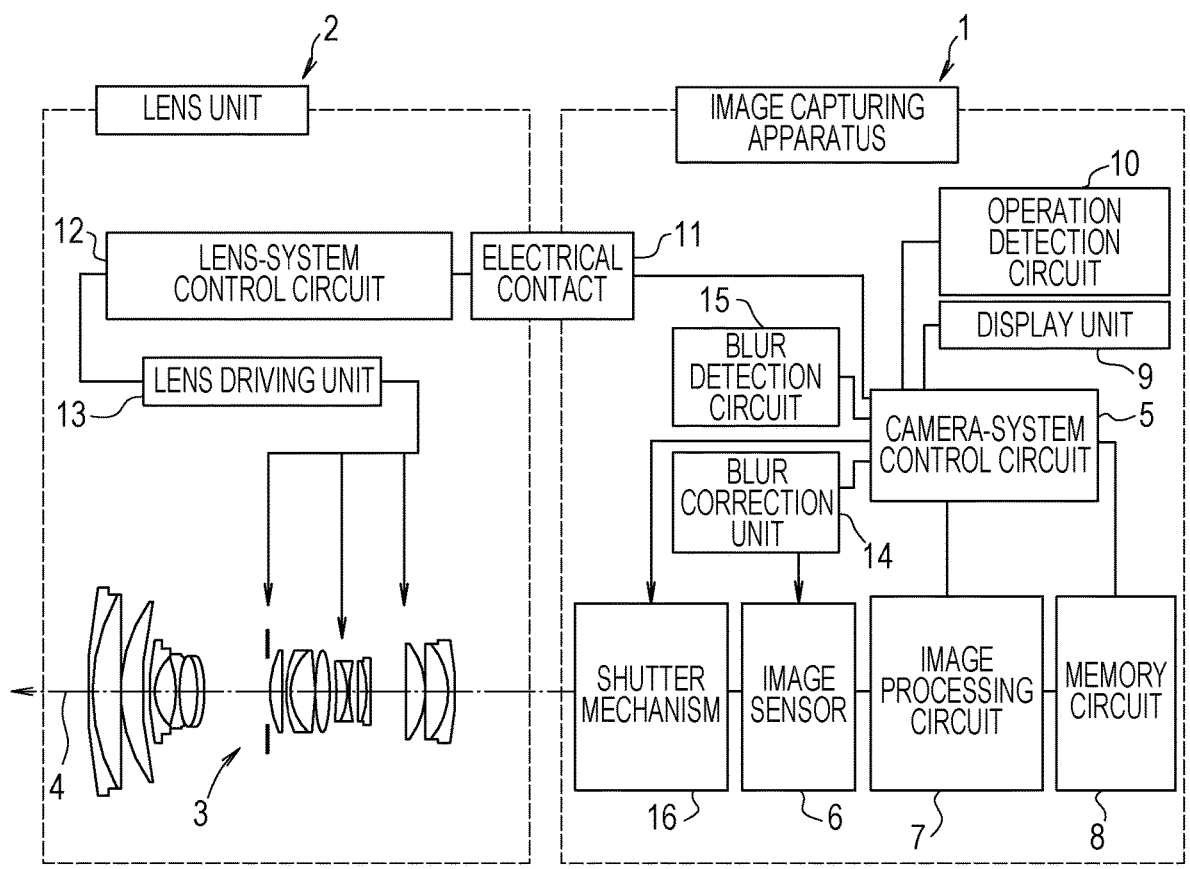
FIG. 1B is a block diagram illustrating the electrical configuration of the image capturing apparatus.

FIG. 1A is a central cross-sectional view of an image capturing apparatus 1 of the present embodiment, and FIG. 1B is a block diagram illustrating the electrical configuration of the image capturing apparatus 1 of the present embodiment. The same reference signs in FIG. 1A and FIG. 1B correspond to each other.

In FIGS. 1A and 1B, a lens unit 2 is what is called an interchangeable lens and is detachable from the image capturing apparatus 1 via a lens mount unit (not illustrated) provided on the casing of the image capturing apparatus 1. FIGS. 1A and 1B illustrate a state in which the lens unit 2 is mounted to the image capturing apparatus 1. The image capturing apparatus 1 and the lens unit 2 in this state are electrically connected by an electrical contact 11. The lens unit 2 includes an imaging optical system 3 including a plurality of lenses. Some of the lenses constitute an image stabilizing lens group. The dashed chain lines in the drawings represent the optical axis 4 of the imaging optical system 3. The lens unit 2 further includes a lens driving unit 13 that drives the image stabilizing lens group, a focus lens, a diaphragm, and so on and a lens-system control circuit 12 that controls the lens driving unit 13. The lens driving unit 13 includes driving mechanisms for the image stabilizing lens group, the focus lens, and the diaphragm, and driving circuits for the driving mechanisms. The lens-system control circuit 12 is a processor, such as a central processing unit (CPU) or a microprocessor unit (MPU), and is electrically connected to the camera-system control circuit 5 of the image capturing apparatus 1 via the electrical contact 11. In the present embodiment, the imaging optical system 3 is disposed in the lens unit 2, which is a detachable interchangeable lens. This is given merely for illustrative purposes. The imaging optical system 3 may be integrated with the image capturing apparatus 1.

The image capturing apparatus 1 includes a camera-system control circuit 5, an image sensor 6, an image processing circuit 7, a memory circuit 8, a display unit 9, an operation detection circuit 10, a shutter mechanism 16, a blur detection circuit 15, and a blur correction unit 14. The electrical contact 11 includes a contact on the image capturing apparatus 1 and a contact on the lens unit 2. The camera-system control circuit 5 controls the individual components in the image capturing apparatus 1 and exchanges various pieces of information with the lens-system control circuit 12 of the lens unit 2 connected via the electrical contact 11.

The blur detection circuit 15 includes blur detecting sensors capable of detecting shakes of the image capturing apparatus 1 in the pitch direction, the yaw direction, and the roll direction about the optical axis 4. These blur detecting sensors include an angular velocity sensor and a vibration gyroscope. Blur detection signals output from the blur detection circuit 15 are sent to the camera-system control circuit 5. The blur correction unit 14 includes a driving mechanism that enables the image sensor 6 of the image capturing apparatus 1 to shift in a plane perpendicular to the optical axis 4 of the imaging optical system 3 and to roll about the optical axis 4 and a driving circuit for the driving mechanism. The camera-system control circuit 5 is a processor, such as a CPU and an MPU, and generates a target value of blur correction based on the blur detection signals, generates a blur-correction control signal based on the target value, and sends the blur-correction control signal to the blur correction unit 14. The driving circuit of the blur correction unit 14 generates a drive signal for shifting the image sensor 6 in a direction perpendicular to the optical axis 4 and rolling the image sensor 6 about the optical axis 4 based on the blur-correction control signal to operate the driving mechanism. This causes the image sensor 6 to shift and roll in a direction in which the blur detected by the blur detection circuit 15 is corrected, so that imager stabilization processing is achieved. The details of the configuration of the driving mechanism of the blur correction unit 14 and control for imager stabilization will be described later.

The camera-system control circuit 5 creates a target value of blur correction performed by the image stabilizing lens group of the lens unit 2 based on the blur detection signals from the blur detection circuit 15. The camera-system control circuit 5 generates a control signal for shifting the image stabilizing lens group in the direction perpendicular to the optical axis 4 on the basis of the target value. The control signal for shifting the image stabilizing lens group in the direction perpendicular to the optical axis 4 is sent to the lens-system control circuit 12 via the electrical contact 11. The lens-system control circuit 12 generates a driving control signal for driving the lens driving unit 13 on the basis of the control signal sent from the camera-system control circuit 5. The lens driving unit 13 drives the image stabilizing lens group on the basis of the driving control signal from the lens-system control circuit 12. Thus, the image stabilizing lens group of the lens unit 2 is shifted in a direction in which the blur detected by the blur detection circuit 15 is corrected, so that lens stabilization processing is performed. The details of driving control of the image stabilizing lens group will be described later.

In the case where both of lens stabilization and imager stabilization are performed at the same time, the target value of blur correction in which the image sensor 6 is shifted, and the target value of blur correction in which the image stabilizing lens group is shifted are set so that image stabilization is achieved using both of the blur correction processes. Therefore, in the case where both of lens stabilization and imager stabilization are performed at the same time, performing the shift of the image stabilizing lens group and the shift and roll of the image sensor 6 on the basis of the target values allows highly effective, high-accuracy image stabilization processing.

The image sensor 6 of the image capturing apparatus 1 includes a charge-coupled device (CCD) sensor or a complementary metal oxide semiconductor (CMOS) sensor and captures an object image or the like formed on an imaging plane via the lens unit 2. The image sensor 6 includes an optical low-pass filter and an RGB color filter corresponding to what is called a Bayer array in front of the imaging plane. The image capture signal output from the image sensor 6 is sent to the image processing circuit 7. The image capture signal output from the image sensor 6 is also sent to the camera-system control circuit 5 via the image processing circuit 7.

The camera-system control circuit 5 obtains a focusing evaluation value for use in focus control and an exposure evaluation value for use in exposure control on the basis of the image capture signal. The camera-system control circuit 5 sends an instruction for focus control to the lens-system control circuit 12 on the basis of the focusing evaluation value. The lens-system control circuit 12 sends a focus lens driving control signal to the lens driving unit 13 on the basis of the instruction for focus control. The lens driving unit 13 drives the focus lens on the basis of the focus lens driving control signal, and thus focusing of the object or the like is performed. The camera-system control circuit 5 sends an instruction for diaphragm control to the lens-system control circuit 12 and sends a shutter-speed control signal to the shutter mechanism 16 on the basis of the exposure evaluation value. The lens-system control circuit 12 sends a diaphragm-driving control signal to the lens driving unit 13 in response to the diaphragm control instruction. The lens driving unit 13 controls the diaphragm in response to the diaphragm-driving control signal. The opening/closing operation of the shutter mechanism 16 is controlled in response to the shutter-speed control signal. More specifically, the shutter mechanism 16 moves a shutter curtain so that an object image reaches the image sensor 6. The shutter mechanism 16 includes at least a curtain (a mechanical rear curtain) for blocking the object image. Exposure is completed by the shutter mechanism 16. The image sensor 6 includes a mode (an electronic front curtain mode) for controlling the timing of starting exposure by resetting the charge for each line prior to the running of the rear curtain performed by the shutter mechanism 16. In the electronic front curtain mode, exposure is controlled by synchronously resetting the charge of the image sensor 6 (the electronic front curtain mode) and driving the rear curtain of the shutter mechanism 16. Thus, the image sensor 6 captures an image of the target object at an appropriate exposure amount.

As described above, the camera-system control circuit 5 performs photometric and ranging operation based on the signal from the image sensor 6 to perform focusing and determine exposure conditions (F-number, shutter speed, and so on).

The image processing circuit 7 is an operation circuit including a plurality of arithmetic and logic units (ALUs) and has a configuration for general image processing, such as an analog-to-digital (A/D) converter, a white-balance adjusting circuit, a gamma correction circuit, and an interpolation operation circuit, and also a configuration for correction processing (image recovery processing) using a correction filter (to be described later). Instead of the image processing circuit 7, the camera-system control circuit 5 may execute the programs stored in the memory circuit 8 to process those functions on software. The details of the correction processing (image recovery processing) performed by the image processing circuit 7 will be described later. The interpolation operation circuit includes a color interpolation circuit. The color interpolation circuit performs color interpolation (demosaicking) processing on an RGB signal corresponding to the Bayer array color filter of the image sensor 6 to generates a color image signal. The image processing circuit 7 also compresses images, moving images, and sound using a predetermined method. The image processing circuit 7 performs such image processing on the image capture signal sent from the image sensor 6 to create image data to be stored.

The memory circuit 8 includes internal memories, such as a read-only memory (ROM) and a random access memory (RAM), and a detachable external memory, such as a semiconductor memory. The ROM of the internal memory stores programs according to the present embodiment, a point spread function (PSF) information (to be described later), and various kinds of setting data. The RAM stores programs read and expanded from the ROM and various kinds of data being processed. In some embodiments, the programs are not only stored in the ROM in advance, for example, but may be read from a detachable semiconductor memory (an external memory) or may be downloaded via a network, such as the Internet (not illustrated). The external memory stores, for example, image data to be stored after being processed by the image processing circuit 7.

The display unit 9 includes a back display unit 9a and an electronic viewfinder (EVF) 9b. The display unit 9 displays images, a user interface screen, and so on under the control of the camera-system control circuit 5.

The operation detection circuit 10 detects user operations on a power switch, a release button, a menu button, and other various switches and buttons provided to the image capturing apparatus 1. The back display unit 9a of the display unit 9 includes a touch panel. The operation detection circuit 10 also detects user operations on the touch panel. The operation detection circuit 10 sends the operation detection signals to the camera-system control circuit 5.

The camera-system control circuit 5 controls the components related to image capturing, as described above, the image processing circuit 7, recording and play back, the display of the display unit 9, and so on according to user operations detected by the operation detection circuit 10. In addition to such control, the camera-system control circuit 5 generates and outputs timing signals for image capturing. For example, upon receiving a detection signal of a user's pressing operation on the release button from the operation detection circuit 10, the camera-system control circuit 5 generates various timing signals related to image capturing to control the driving of the image sensor 6 and the operation of the image processing circuit 7. Thus, the image capturing apparatus 1 of the present embodiment is configured such to capture still images and moving images by controlling the operation of the components of the image capturing apparatus 1 using the camera-system control circuit 5 according to user operations detected by the operation detection circuit 10.

Figure 2:
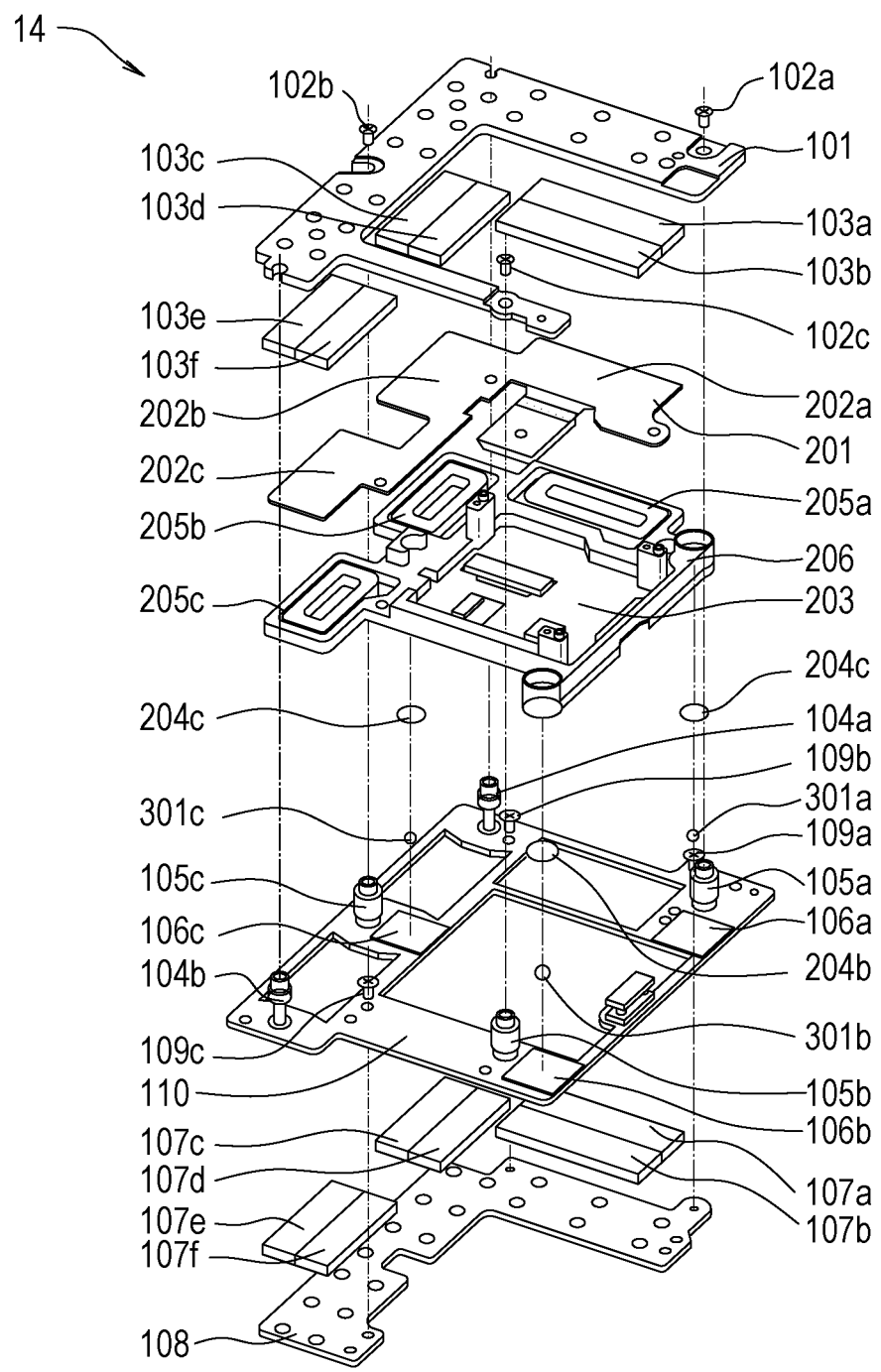
FIG. 2 is an exploded perspective view of a blur correction unit according to an embodiment of the present disclosure.

Referring next to FIG. 2, the detailed configuration and operation of the driving mechanism of the blur correction unit 14 of the image capturing apparatus 1 according to the present embodiment will be described. FIG. 2 is an exploded perspective view of the driving mechanism of the blur correction unit 14 for moving the image sensor 6 to reduce a blur. Although the blur correction unit 14 includes an electric driving circuit (not illustrated) that operates the driving mechanism in FIG. 2 in response to a control signal from the camera-system control circuit 5, only a mechanical mechanism is illustrated in FIG. 2.

In FIG. 2, the dashed chain lines are parallel to the optical axis 4 of the imaging optical system 3 of the lens unit 2. In FIG. 2, the members denoted by reference numbers in the hundreds are stationary members (members fixed to the casing or the like of the image capturing apparatus 1), and the members denoted by reference numbers in the two hundreds are moving members (movable members that are not fixed to the casing or the like of the image capturing apparatus 1). The members denoted by reference numbers in the three hundreds are balls held by a fixing member and a movable member.

The main components of the fixing unit of the blur correction unit 14 illustrated in FIG. 2 are an upper yoke 101, upper magnets 103a to 103f, fixing-unit rolling plates 106a to 106c, lower magnets 107a to 107f, a lower yoke 108, and a base plate 110. The fixing unit further includes auxiliary spacers 104a and 104b, main spacers 105a to 105c, and screws 102a to 102c and 109a to 109c. The main components of the movable unit of the blur correction unit 14 are a flexible printed circuit (FPC) 201, movable-unit rolling plates 204a to 204c, coils 205a to 205c, a movable frame 206, and balls 301a to 301c. The FPC 201 has position-detection-element mounting positions 202a to 202c, to which position detection elements are mounted.

The upper yoke 101, the upper magnets 103a to 103f, the lower magnets 107a to 107f, and the lower yoke 108 constitute a magnetic circuit to form what is called a closed magnetic path. The upper magnets 103a to 103f are bonded to the upper yoke 101. Similarly, the lower magnets 107a to 107f are bonded to the lower yoke 108. The upper magnets 103a to 103f and the lower magnets 107a to 107f are individually polarized along the optical axis (the vertical direction in FIG. 2), and adjacent magnets (in the positional relationship between the magnets 103a and 103b) are polarized in different directions. Opposing magnets (in the positional relationship between the magnets 103a and 107a) are polarized in the same direction. This causes a strong magnetic flux density along the optical axis between the upper yoke 101 and the lower yoke 108.

Since a strong attractive force is generated between the upper yoke 101 and the lower yoke 108, an appropriate interval is provided between the upper yoke 101 and the lower yoke 108 using the main spacers 105a to 105c and the auxiliary spacer 104a and 104b. The appropriate interval provides a space for the coils 205a to 205c and the FPC 201 and an appropriate space between the upper magnets 103a to 103f and the lower magnets 107a to 107f. The main spacers 105a to 105c each have a screw hole, so that the upper yoke 101 is fixed to the main spacers 105a to 105c with the screws 102a to 102c.

Rubber is disposed on the bodies of the main spacers 105a to 105c to form mechanical ends (that is, stoppers) of the moving unit.

The base plate 110 has holes so as to let out the lower magnets 107a to 107f so that the surfaces of the lower magnets 107a to 107f protrude from the holes. In other words, the base plate 110 and the lower yoke 108 are fixed together using the screws 109a to 109c, and the lower magnets 107a to 107f with a thickness larger than the thickness of the base plate 110 protrude from the base plate 110.

The movable frame 203 is formed from die cast magnesium or die cast aluminum and has light weight and high rigidity. The components of the movable unit are fixed to the movable frame 203 to form the movable unit. The position detection elements are mounted to a surface of the FPC 201, which is not viewed in FIG. 2, at the position-detection-element mounting positions 202a to 202c. For example, Hall elements are disposed to allow detecting the positions using the magnetic circuit described above. Since Hal elements are small, the Hall elements are rested inside the coils 205a to 205c.

The movable frame 203 connects to the image sensor 6 (not illustrated in FIG. 2), the coils 205a to 205c, and the Hall elements. The movable frame 203 performs electrical exchange with the outside via connectors.

The fixing-unit rolling plates 106a to 106c are bonded to the base plate 110, and the movable-unit rolling plates 204a to 204c are bonded to the movable frame 203 to form rolling surfaces of the balls 301a to 301c. Separately providing the rolling plates 106a to 106c and 204a to 204c facilitates providing desired surface roughness and hardness.

The driving mechanism of the blur correction unit 14 illustrated in FIG. 2 generates a force according to Fleming's left-hand rule by letting a current to flow through the coils 205a to 205c to allow the movable unit to move. The blur correction unit 14 is capable of feedback control by using the signals from the Hall elements, which are the position detection elements described above. The blur correction unit 14 can also translate the image sensor 6 in a plane perpendicular to the optical axis 4 or roll the image sensor 9 about the optical axis 4 by appropriately controlling the values of the signals from the Hall elements.

Since in the present embodiment the rolling about the optical axis 4 is important in blur correction using imager stabilization, as will be described later, the rolling about the optical axis 4 will be described. The driving mechanism of the blur correction unit 14 can generate approximate rotational motion about the optical axis 4 by driving the Hall elements at the positions 202b and 202c in opposite phases while keeping the signal from the Hall element at the position 202a constant.

In the image capturing apparatus 1 of the present embodiment, the camera-system control circuit 5 implements imager stabilization by controlling the blur correction unit 14 and implements lens stabilization by controlling the image stabilizing lens group of the lens unit 2 on the basis of the blur detection signal from the blur detection circuit 15. In the blur correction using imager stabilization, the image sensor 6 is rolled about the optical axis 4.

Figure 3:
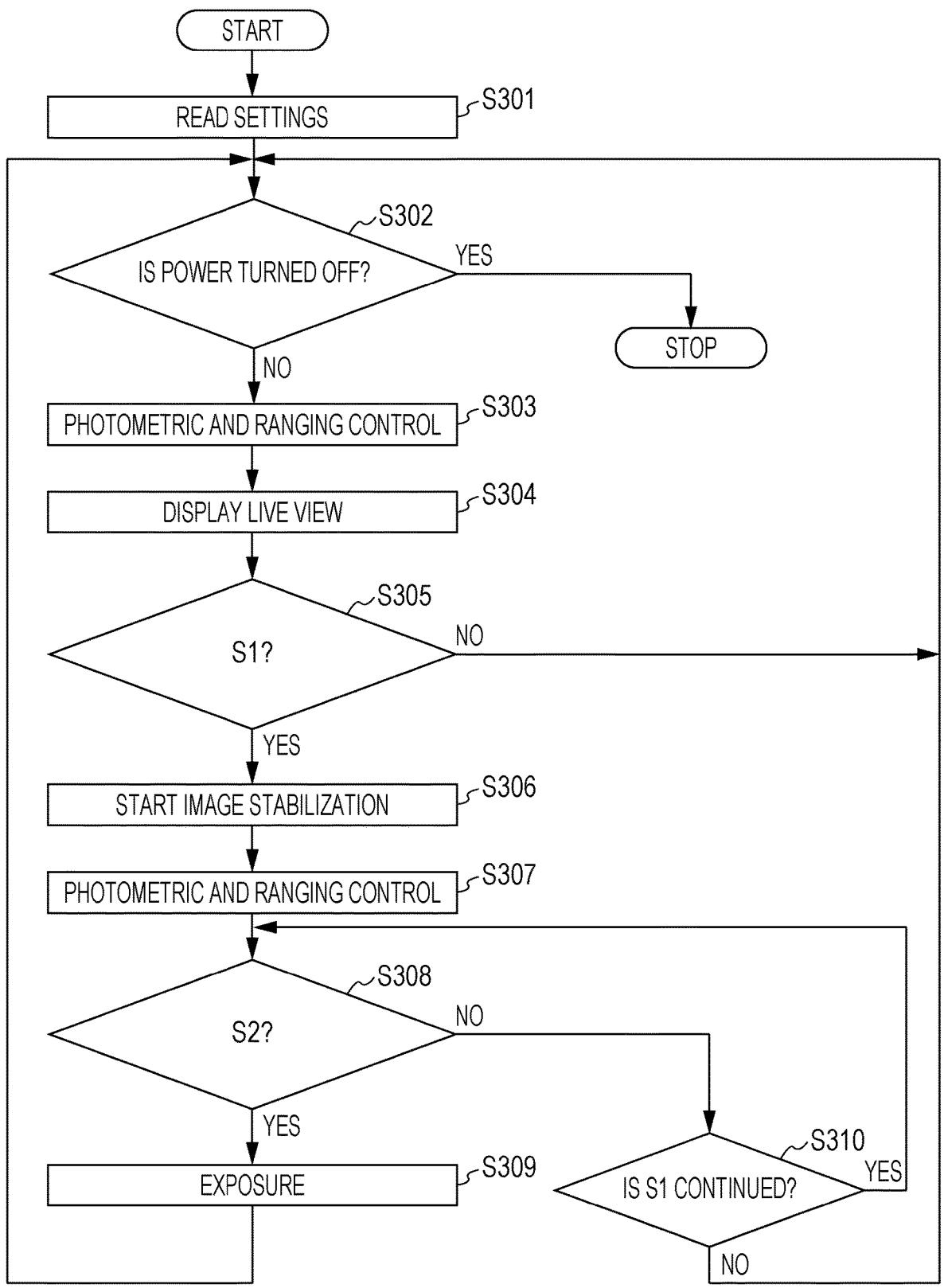
FIG. 3 is a flowchart illustrating a sequence of shooting performed by the image capturing apparatus.

FIG. 3 is a flowchart illustrating a sequence of operations from power-on until image capturing is performed by the image capturing apparatus 1 of the present embodiment. Referring to FIG. 3, the operations from power-on until image capturing is performed by the image capturing apparatus 1 will be described in sequence. The processing in the flowchart of FIG. 3 may be performed using either of hardware configuration and software configuration, or partly performed using software configuration, and the remaining part using hardware configuration. For example, in the case where the memory circuit 8 includes a RAM and a ROM, programs stored in the ROM are expanded into the RAM, and the camera-system control circuit 5, which is a CPU, executes the programs to implement the processing of the flowchart in FIG. 3. This also applies to other flowcharts described later.

When a power-on operation is detected by the operation detection circuit 10, the camera-system control circuit 5 starts the control illustrated in the operation flowchart in FIG. 3.

Next at step S301, the camera-system control circuit 5 reads shooting conditions set by the user or shooting conditions stored in the memory circuit 8 in advance.

Examples of the settings of the shooting conditions read at step S301 include a setting indicating whether to use the electronic front curtain and a setting indicating whether to assign aperture priority and shutter speed priority.

Next at step S302, the camera-system control circuit 5 determines whether the user turns off the power, and if the camera-system control circuit 5 determines that the power is turned off, the processing of the flowchart in FIG. 3 ends. If at step S302 the camera-system control circuit 5 determines that the power is not turned off, the camera-system control circuit 5 advances the process to step S303. Although steps S302, S305, and S308 corresponding to user operations are in general interrupt processing, the steps are described as a processing procedure in FIG. 3.

At step S303, the camera-system control circuit 5 performs photometric and ranging control at live view display on the basis of an image capture signal sent from the image sensor 6 via the image processing circuit 7. Thus, the focal position and exposure conditions when capturing a live view image are determined.

Next at step S304 the camera-system control circuit 5 sends data on an image captured by the image sensor 6 and processed by the image processing circuit 7 under the photometric and ranging conditions for live view display to the display unit 9 to display the image in live view. In the live view display, the image is displayed on the back display unit 9a or the EVF 9b of the display unit 9.

Next at step S305, the camera-system control circuit 5 determines whether an S1 operation by the user is detected by the operation detection circuit 10. If the S1 operation is not detected, the camera-system control circuit 5 returns the process to step S301. If the S1 operation is detected, the process is advanced to step S306.

At step S306, the camera-system control circuit 5 starts control for the image stabilization processing for lens stabilization and imager stabilization (image stabilization control), described above.

Next at step S307, the camera-system control circuit 5 performs photometric and ranging control based on the image capture signal sent from the image sensor 6 via the image processing circuit 7 after the S1 operation. At that time, the camera-system control circuit 5 determines an f number and a shutter speed (Tv value) on the basis of the image capture signal sent from the image sensor 6 via the image processing circuit 7.

Next at step S308, the camera-system control circuit 5 determines whether an S2 operation by the user is detected by the operation detection circuit 10. If the camera-system control circuit 5 determines that the S2 operation is detected, the process is advanced to step S309. If the camera-system control circuit 5 determines that the S2 operation is not detected, the process is advanced to step S310.

At step S309, the camera-system control circuit 5 controls the shutter mechanism 16 to cause the shutter curtain to run and the image sensor 6 to capture an image of the object and so on. After step S309, the camera-system control circuit 5 returns the process to S302.

If the process goes to step S310, the camera-system control circuit 5 determines whether the S1 operation is kept. If the camera-system control circuit 5 determines that the S1 operation is kept, the process is returned to step S308. If the camera-system control circuit 5 determines that the S1 operation is not kept, the process is returned to step S302.

When a fixed time passes after a pressing operation on the release button by the user is cancelled so that the S1 operation is cancelled, the camera-system control circuit 5 turns off the image stabilization control (not illustrated in FIG. 3).

In the present embodiment, degraded components generated in the captured image due to the influence of aberration and diffraction caused by the image stabilization processing, described above, and correction processing for correcting the degraded components will be described in outline. The methods for the image stabilization processing and correction processing described here are used in the image capturing apparatus 1 of the present embodiment as appropriate.

The imaging optical system 3 of the image capturing apparatus 1 according to the present embodiment is designed to accurately correct spherical aberration, coma, field curvature, and astigmatism. However, for example, the image stabilization processing may cause a change in the aberration to degrade the captured image. For example, when the image stabilizing lens group is moved in a direction perpendicular to the optical axis 4 of the imaging optical system 3 by lens stabilization, the aberration may change due to the eccentricity of the optical axis 4 generated between the imaging optical system 3 and the image stabilizing lens group to degrade the captured image.

Lens aberration changes depending on the aperture diameter and so on, of which lateral aberration is generally decreased as the aperture diameter decreases. The diffraction phenomenon occurs less frequently as the aperture diameter is larger, for example, f/2.8, and occurs more frequently as the aperture diameter is smaller, for example, f/11 or f/22. Like the aberration, this diffraction phenomenon may also be a factor that degrades the captured image.

The aberration and diffraction can be described using a point spread function (hereinafter referred to as PSF) or an optical transfer function (hereinafter referred to as OTF). The mage degraded components due to aberration or diffraction is generated because light generated from one point of the object, which is to be focused on one point on an imaging plane without the influence of aberration and diffraction, spreads, and can be expressed using the PSF. The OTF obtained by Fourier transforming the PSF is frequency component information on the aberration and is represented by a complex number. The absolute value of the OTF, that is, an amplitude component, is referred to as a modulation transfer function (MTF), and the phase component is referred to as a phase transfer function (PTF). The MTF (amplitude component) and the PTF (phase component) are respectively the frequency responses of the amplitude component and the phase component of image degradation due to aberration. The phase component is expressed as a phase angle by Eq. (1).

$$PTF=\tan^{-1}(Im(OTF)/Re(OTF)) \quad \text{Eq. (1)}$$

where Re(OTF) is the real part of OTF and Im(OTF) is the imaginary part of OTF.

The degradation of the captured image due to aberration and diffraction can be corrected by correcting the degraded component of the MTF (amplitude component) and the PTF (phase component). An example of a method for correcting the degraded components of the MTF (amplitude component) and the PTF (phase component) is a method of correction based on the information on the OTF or the PSF of the imaging optical system. In the present embodiment, the correction processing for correcting the degradation of the captured image based on the OTF or PSF information of the imaging optical system 3 is image recovery processing. One method for image recovery processing is convolution of a function having the inverse characteristic of the OTF to the input image (captured image). The function having the inverse characteristic of the OTF is used as a correction filter for correcting image degradation (an image recovery filter in the image recovery processing).

The image recovery processing, which is correction processing on the degraded components of the captured image, and the correction filter (the image recovery filter) for use in the image recovery processing will be described. In the case of the image capturing apparatus 1 of the present embodiment, the image recovery processing is performed by the image processing circuit 7.

In the present embodiment, the input image for the image recovery processing is a captured image that the image sensor 6 captured via the imaging optical system 3, and the output image is an image after the image recovery processing. The captured image (input image) is degraded because of the OTF due to the aberrations of the lenses and various optical filters (not illustrated) in the imaging optical system 3 and the OTF because of diffraction due to the diaphragm and the optical members (not illustrated) in the imaging optical system 3. In the following description, the degraded captured image (input image) is expressed as "degraded image". The imaging optical system may include not only the lenses but also a mirror (reflecting surface) having a curvature. An example of the input image is a RAW image having RGB color component information, but the input image is not limited to the RAW image. The input image and the output image may be given shooting conditions, such as whether an optical member is present, the lens focal length, the f number, the object distance, and various pieces of correction information for correcting the images.

First, the outline of the image recovery processing will be described.

The following Eq. (2) holds.

$$g(x,y)=h(x,y)*f(x,y) \quad \text{Eq. (2)}$$

where g(x, y) is a degraded image (captured image), f(x, y) is an original image, and h(x, y) is a point spread function (PSF), which is a Fourier pair of the optical transfer function (OTF). In Eq. (2), * is a convolution (convolution integral, the sum of products), and (x, y) is the coordinates on the captured image.

Fourier transforming Eq. (2) to a frequency display form gives Eq. (3) expressed by the product for each frequency.

$$G(u,v)=H(u,v)\cdot F(u,v) \quad \text{Eq. (3)}$$

where H is an optical transfer function (OTF) obtained by Fourier transforming the point spread function (PSF) (h), G is a function obtained by Fourier transforming the degraded image g, F is a function obtained by Fourier transforming the original image f, and (u, v) is the coordinates on a two-dimensional frequency plane, that is, the frequency.

To obtain the original image f from the captured degraded image g, both sides are divided by the optical transfer function H, as in Eq. (4).

$$G(u,v)/H(u,v)=F(u,v) \quad \text{Eq. (4)}$$

Inversely Fourier transforming F(u, v), that is, G(u, v)/H (u, v), gives the original image f(x, y) as a recovered image.

Convolution operation on the image on an actual plane, as in Eq. (5), gives the original image f(x, y).

$$g(x,y)*R(x,y)=f(x,y) \quad \text{Eq. (5)}$$

where R is an inverse Fourier transform of $H^{-1}$.

R(x, y) in Eq. (5) represents an image recovery filter. In the case of a two-dimensional image, the image recovery filter R generally has taps (cells) corresponding to the individual pixels and has a distribution of two-dimensional filter values. The recovery accuracy is generally improved as the number of taps (cells) of the image recovery filter R increases. For that reason, a feasible number of taps is set according to the required image quality, the image processing capability, the spreading width of the point spread function (PSF), and the aberration properties. The image recovery filter R differs from general edge enhancement filters with about three taps in the horizontal and vertical directions (high pass filters) because the image recovery filter R needs to reflect at least the characteristics of the aberration and diffraction. Since the image recovery filter R is set on the basis of the optical transfer function (OTF), both of the degradation of the amplitude component and the phase component can be accurately corrected.

Since the actual image includes a noise component, the use of the image recovery filter R created by taking the inverse of the OTF, as described above, significantly amplifies the noise component with the recovery of the degraded image. This is because, if the MTF (amplitude component) of the optical system is normalized to 1 for the state in which the amplitude of the noise is added to the amplitude component of the image, the MTF is raised so as to return to 1 for all the frequencies. The MTF, which is degraded in amplitude by the optical system, returns to 1, but the power spectrum of the noise is also raised, resulting in amplification of the noise according to the degree of raising the MTF (recovery gain).

Therefore, when the image contains a noise, a high-quality image that can be used for viewing cannot be obtained. This is expressed as Eq. (6-1) and Eq. (6-2).

$$G(u,v)=H(u,v)\cdot F(u,v)+N(u,v) \quad \text{Eq. (6-1)}$$

$$G(u,v)/H(u,v)=F(u,v)+N(u,v)/H(u,v) \quad \text{Eq. (6-2)}$$

where N is the noise component.

For an image containing a noise component, there is a method for controlling the degree of recovery according to the intensity ratio of the image signal to the noise signal (SNR), like Wiener filtering, expressed by Eq. (7).

$$M(u, v) = \frac{1}{H(u, v)} \frac{|H(u, v)|^2}{|H(u, v)|^2 + SNR^2} \qquad \text{Eq. (7)}$$

In Eq. (7), M(u, v) is the frequency response of the Wiener filter, and |H(u, v)| is the absolute value of the optical transfer function (OTF) (the absolute value of the MTF). In the present embodiment, M(u, v) corresponds to the frequency response of the image recovery filter. In this method, the recovery gain (the degree of recovery) is decreased as the MTF decreases, and the recovery gain is increased as the MTF increases for each frequency. Since the MTF of the imaging optical system is generally high at a low frequency and low at a high frequency, this method substantially decreases the recovery gain of the image at a high frequency.

The gain characteristics of the image recovery filter change depending on the term of SNR in Eq. (7). For that reason, the term of SNR is used as a parameter C in Eq. (8) for simply controlling the recovery gain (the degree of recovery).

$$M(u, v) = \frac{1}{H(u, v)} \frac{|H(u, v)|^2}{|H(u, v)|^2 + C} \qquad \text{Eq. (8)}$$

In Eq. (8), if the parameter C=0, M(u, v) is equal to the inverse filter of the optical transfer function (OTF) (the reciprocal of the MTF), and the gain of the image recovery filter decreases as the parameter C is increased. When the parameter C becomes greater than $|H(u, v)|-|H(u, v)|^2$ ($C>|H(u, v)|-|H(u, v)|^2$), the gain of the image recovery filter becomes one time or less.

Figure 4A:
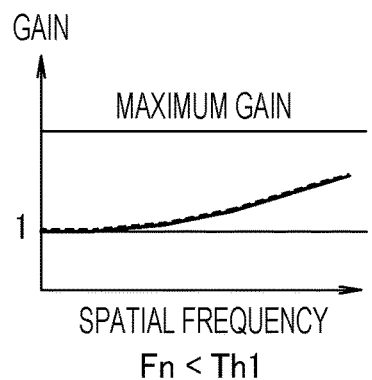
FIG. 4A is a diagram illustrating the relationship between the gain characteristics of the inverse filter of an OTF and an image recovery filter when an f number Fn is less than a predetermined value Th1.
Figure 4B:
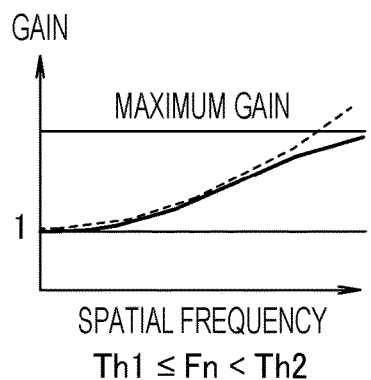
FIG. 4B is a diagram illustrating the relationship between the gain characteristics of the inverse filter of the OTF and the image recovery filter when the f number Fn is greater than or equal to the predetermined value Th1 and less than a predetermined value Th2.
Figure 4C:
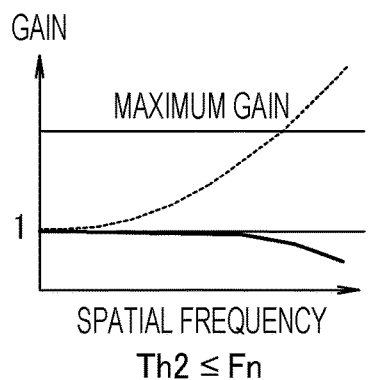
FIG. 4C is a diagram illustrating the relationship between the gain characteristics of the inverse filter of the OTF and the image recovery filter when the f number Fn is greater than or equal to the predetermined value Th2.

This is schematically illustrated in FIGS. 4A to 4C. FIGS. 4A to 4C are diagrams illustrating the relationship between the gain characteristic of the inverse filter of the OTF and the gain characteristic of the image recovery filter. In FIGS. 4A to 4C, the vertical axis represents the gain, and the horizontal axis represents the spatial frequency. In FIGS. 4A to 4C, the dotted lines represent the gain characteristic of the inverse filter of the OTF, and the solid lines represent the gain characteristic of the image recovery filter.

If the f number Fn is less than a predetermined value Th1 (Fn<Th1), the gain of the image recovery filter does not become larger than a predetermined maximum gain, so that the parameter C can take 0. Therefore, the reciprocal of the MTF (the gain of the inverse filter of the OTF) and the gain of the image recovery filter agree with each other. 4A). If the f number Fn is greater than or equal to the predetermined value Th1 and less than a predetermined value Th2 (Th1≤Fn<Th2), the gain on the high frequency side of the inverse filter becomes larger than the predetermined maximum gain. For that reason, the parameter C is set to a greater value to suppress the gain at the high frequency side of the image recovery filter (FIG. 4B). If the f number Fn is greater than or equal to Th2 (Th2≤Fn), and $C>|H(u, v)|-|H(u, v)|^2$, the gain of the image recovery filter becomes less than or equal to one time (FIG. 4C). The predetermined values Th1 and Th2 (f numbers) are determined depending on the pixel pitch of the image sensor 6, the characteristics of the optical low-pass filter, the maximum value of the recovery gain (the degree of recovery) of the image recovery filter, and the parameter C for use in controlling the recovery gain.

Thus, the gain characteristic (the tendency) of the image recovery filter greatly changes with the f number. In the present embodiment, the data amount of the image recovery filter held in the image capturing apparatus 1 can be reduced by the following computation in consideration of the tendency.

Figure 5:
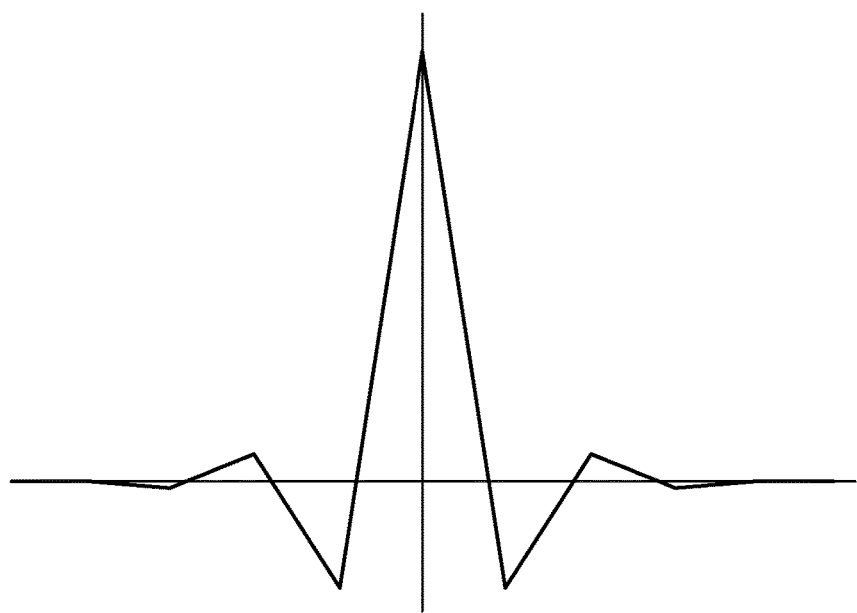
FIG. 5 is a diagram illustrating the characteristics of the image recovery filter.

Referring next to FIG. 5, the image recovery filter used in the present embodiment will be described.

FIG. 5 is a diagram illustrating the characteristics of the image recovery filter. The number of taps of the image recovery filter is determined depending on the spread of the point spread function (PSF) due to the aberration and diffraction of the imaging optical system 3 and the recovery accuracy required for the image recovery processing. In the present embodiment, the image recovery filter is, for example, a two-dimensional filter with 11-by-11 taps. However, this is given for mere illustrative purposes. An image recovery filter with more taps may be used in view of the relationship between the spread width of the PSF and the pixel pitch. The distribution of the values of the taps (coefficient values) of the image recovery filter has the function of returning the spatially spread signal values or pixel values due to the aberration to, ideally, the original one point. For diffraction due to the aperture, which can be approximated to rotational symmetry, the PSF due to the diffraction is rotationally symmetric. Therefore, the characteristics of the image recovery filter is symmetric as in FIG. 5.

In the present embodiment, in each tap of the image recovery filter, convolution processing (convolution integral, summing of products) is performed in the process of image recovery processing for each pixel of the image. In the convolution processing, to improve the signal value of a predetermined pixel, the pixel is set at the center of the image recovery filter, the product of the signal value of the image and the value of each tap is calculated for each corresponding pixel of the image recovery filter, and the sum of the products is substituted as the signal value of the central pixel.

Referring next to FIGS. 6A and 6B and FIGS. 7A and 7B, the characteristics of the image recovery processing in the actual space and the frequency space will be described.

Figure 6A:
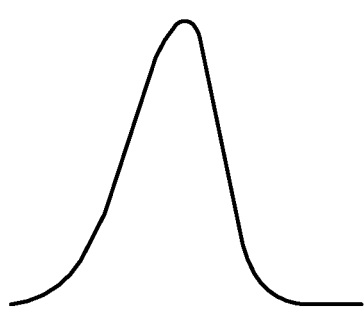
FIG. 6A is a diagram illustrating a PSF before image recover.
Figure 6B:
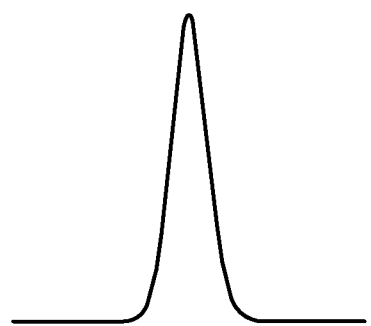
FIG. 6B is a diagram illustrating the PSF after image recovery.
Figure 7A:
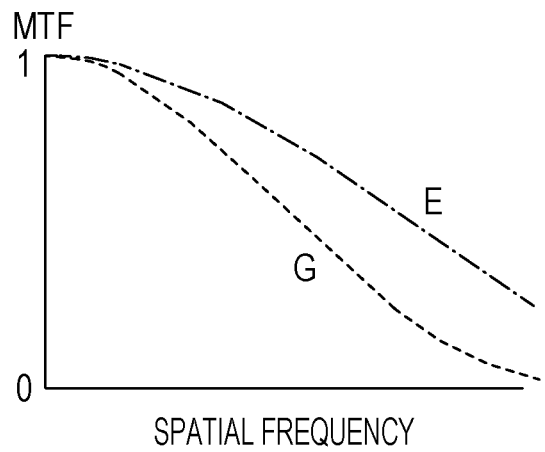
FIG. 7A is an explanatory diagram of the MTF (amplitude component) of the optical transfer function (OTF).
Figure 7B:
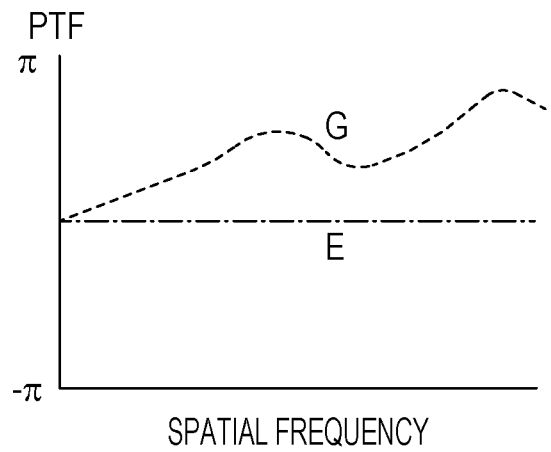
FIG. 7B is a diagram illustrating the phase component of an optical transfer function.

FIGS. 6A and 6B are explanatory diagrams of the point spread function (PSF). FIG. 6A illustrates a PSF before image recovery, and FIG. 6B illustrates the PSF after image recovery. FIG. 7A is an explanatory diagram of the MTF (amplitude component) of the optical transfer function (OTF), and FIG. 7B is an explanatory diagram of the PTF (phase component). In FIG. 7A, the broken line G represents a MTF before image recovery, and the dashed chain line E represents the MTF after image recovery. In FIG. 7B, the broken line G represents a PTF before image recovery, and the dashed chain line E represents the PTF after image recovery.

As illustrated in FIG. 6A, the PSF before image recovery has an asymmetric distribution due to the aberration. The PTF has nonlinear values with respect to the frequency because of the asymmetric characteristic. In the image recovery processing, since the image is corrected so that the MTF is amplified and the PTF becomes zero, the PSF after image recovery has a symmetric, sharp shape.

For diffraction due to the aperture, which can be approximated to rotational symmetry, the PSF due to the diffraction is rotationally symmetric. As a result, the broken line E in FIG. 7B takes 0. In other words, the diffraction in the present embodiment has no phase shift. Since the principle of the image recovery, described above, functions regardless of whether a phase shift has occurred, the image recovery is effective also in the present embodiment in which diffraction is to be corrected.

Thus, the image recovery filter can be obtained by Fourier transforming a function designed on the basis of the inverse function of the optical transfer function (OTF) of the imaging optical system 3. The image recovery filter used in the present embodiment can be changed as appropriate. For example, the Wiener filter described above can be used. The use of the Wiener filter allows an image recovery filter in the actual space which is convolved in the image to be created by inversely Fourier transforming Eq. (7).

The OTF changes according to the image height (the position of the image) of the imaging optical system 3 in one shooting state (shooting condition). For that reason, the image recovery filter is changed and used according to the image height. In contrast, an OTF on which the influence of diffraction becomes dominant as the f number increases can be dealt as an OTF that is constant with respect to the image height if the vignetting of the optical system is small.

In the present embodiment, diffraction (a diffraction blur) is also to be corrected. If the f number is small, the image recovery filter depends on the f number, the wavelength of light, and the image height (image position). For that reason, a uniform (constant) image recovery filter cannot be used in one image. In other words, the image recovery filter of the present embodiment is created by computation using an optical transfer function including a diffraction blur generated according to the f number. A method for computing the image recovery filter will be described later. For wavelengths, optical transfer functions at a plurality of wavelengths are calculated, and an optical transfer function for each color component is created by assigning a weight for each wavelength on the basis of the supposed spectral characteristic of the light source and the light-receiving sensitivity information on the image sensor. In some embodiments, a predetermined representative wavelength of each color component is used for the calculation, and the image recovery filter is created on the basis of the optical transfer function for each color component.

In image recovery processing, the image processing circuit 7 first obtains shooting condition information, described above, from the camera-system control circuit 5. The image processing circuit 7 selects one or more image recovery filters for each of an axial light flux and an off-axis light flux according to the f number in shooting from the shooting condition information. The image processing circuit 7 creates a recovered image (output image) from the captured image (input image) using the selected image recovery filter.

The recovered image created by the image processing circuit 7 is stored in the memory circuit 8 in a predetermined format. The display unit 9 displays an image obtained by performing a predetermined process on the image processed by the image processing circuit 7. The display unit 9 may display an image subjected to a simple process for high-speed display.

If an optical element that has an influence on the characteristics of the OTF is provided in addition to the lens unit 2, the influence may be considered in creating the image recovery filter. An example is the influence of an optical low-pass filter disposed in front of the image sensor 6. In this case, the image processing circuit 7 creates the image recovery filter on the basis of an optical transfer function due to the optical low-pass filter. If an infrared cut filter is disposed in the photographing optical path, the infrared cut filter has an influence on the point spread functions (PSFs) of the RGB channels, which are the integral values of the PSFs of the spectral wavelengths, in particular, the PSF of the R channel. Therefore, the influence is considered in creating the image recovery filter. In this case, the image processing circuit 7 creates the image recovery filter on the basis of the optical transfer function due the infrared cut filter. The shape of the pixel opening also exerts an influence on the optical transfer function, and the influence is taken into consideration. In this case, the image processing circuit 7 creates the image recovery filter on the basis of the optical transfer function based on the pixel opening.

Figure 8:
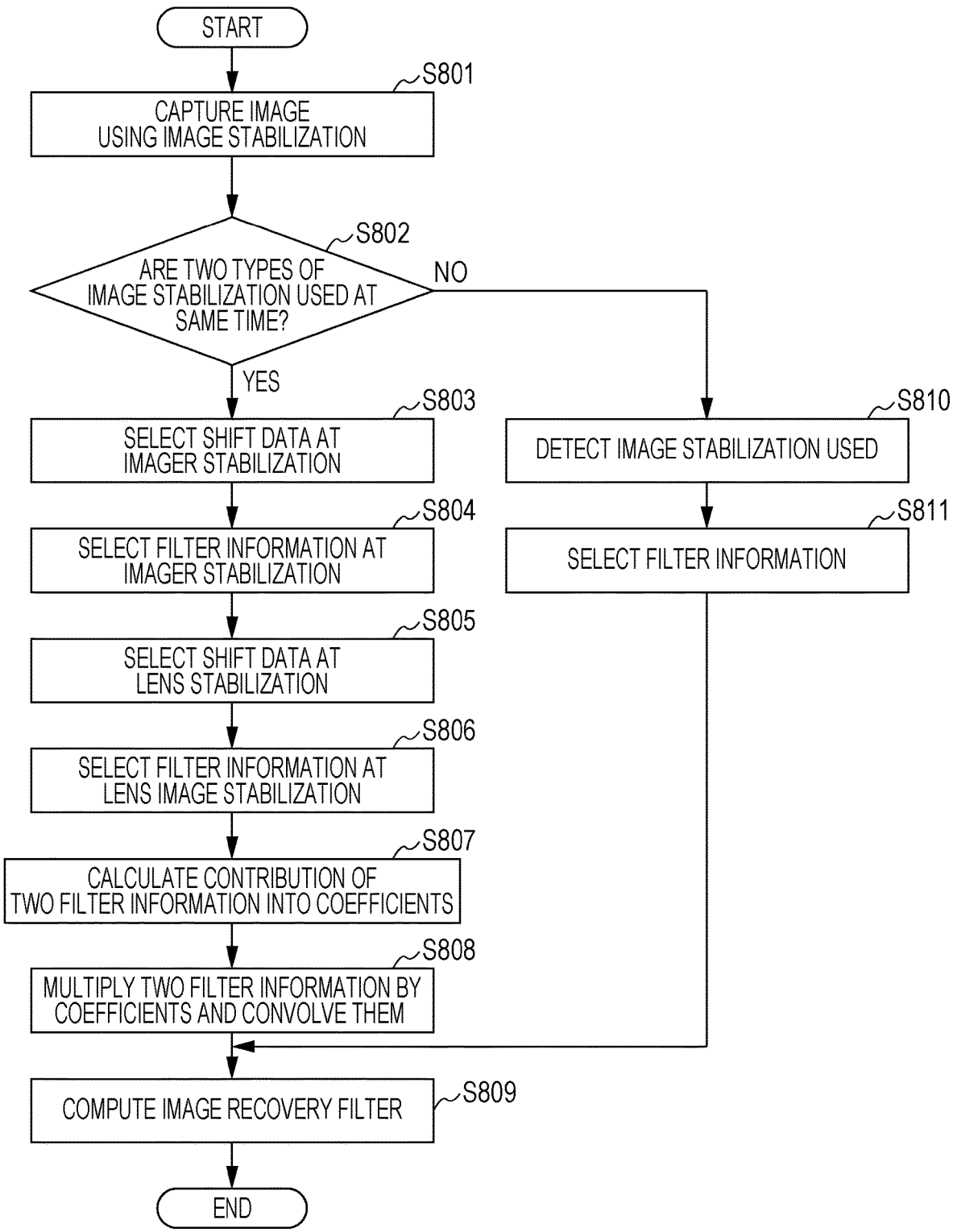
FIG. 8 is a flowchart for an image recovery filter creating process according to an embodiment of the present disclosure.

FIG. 8 is a flowchart illustrating the procedure of the image recovery processing performed by the image processing circuit 7 under the control of the camera-system control circuit 5.

For effective image recovery processing, accurate OTF or PSF information on the imaging optical system 3 is required. The OTF or PSF information can be calculated from, for example, setting information designed for the imaging optical system 3, if present. The PSF or OTF information can also be obtained from a light intensity distribution obtained when a point light source is photographed or by Fourier transforming the intensity distribution. For diffraction, the OTF or PSF information can be obtained using a theoretically derived formula.

For that reason, when an image blur is reduced by image stabilization processing, and image recovery processing is performed to correct image degradation due to the image stabilization processing, an enormous amount of OTF or PSF information may be needed. Specifically, the aberration generated in an optical image on the imaging plane of the image sensor 6 differs between in an eccentric state in which the optical axis 4 of the imaging optical system 3 becomes eccentric because the image stabilizing lens group is shifted to a direction perpendicular to the optical axis 4 by lens stabilization and in a non-eccentric state in which the optical axis 4 is not eccentric. For that reason, for desired image recovery processing, OTF or PSF information in the eccentric state has to be stored in addition to OTF or PSF information in the non-eccentric state. At imager stabilization, the image sensor 6 is shifted in the direction perpendicular to the optical axis 4 of the imaging optical system 3 or is rolled about the optical axis 4. For that reason, the image circle of the imaging optical system 3 ready for imager stabilization is considerably larger than the image circle of an imaging optical system that is not ready for imager stabilization. Accordingly, for imager stabilization, it is necessary to store OTF or PSF information for the image height in the large image circle ready for imager stabilization.

For simultaneous use of two or more types of image stabilization processing, much more OTF or PSF information will be needed. In the present embodiment, OTF or PSF information is needed for non image stabilization processing state (a non-eccentric state), lens stabilization (an eccentric state), imager stabilization, and the simultaneous use of lens stabilization and imager stabilization. For the simultaneous use of lens stabilization and imager stabilization, OTF or PSF information for an image height higher than an image height for imager stabilization is needed to ready for the eccentric state due to lens stabilization. In other words, for the simultaneous use of two or more types of image stabilization processing, a massive amount of OTF or PSF information has to be stored in advance.

The flowchart in FIG. 8 illustrates image recovery processing for recovering from degradation in the captured image due to aberration and diffraction in the imaging optical system 3 in the case where image stabilization processing incorporates both of lens stabilization and imager stabilization. This image recovery processing may be performed immediately after shooting or at the playback of the recorded image. The flowchart in FIG. 8 illustrates an example in which PSF information is stored as filter information on the image recovery filter.

When image stabilization control is ON, the camera-system control circuit 5 starts the operation of the flowchart in FIG. 8. When the operation of the flowchart in FIG. 9 is started, first at step S801, the camera-system control circuit 5 captures an image using the image sensor 6, with the image stabilization processing executed. The image capturing at that time may be still-image capturing or moving-image capturing.

Next at step S802, the camera-system control circuit 5 determines whether both of lens stabilization and imager stabilization are used at the same time. If the camera-system control circuit 5 determines that lens stabilization and imager stabilization are used at the same time, the process is advanced to step S803. If the camera-system control circuit 5 determines that lens stabilization and imager stabilization are not used at the same time, the process goes to step S810.

At step S803, the camera-system control circuit 5 obtains data on the shift of the image sensor 6 due to imager stabilization during shooting on the basis of the shooting conditions that lens stabilization and imager stabilization are used at the same time (determined at step S802). The obtained shift data includes the amount of shift of the image sensor 6 in the direction perpendicular to the optical axis 4 of the imaging optical system 3, the amount of roll of the image sensor 6 about the optical axis 4, and the amount of tilt of the image sensor 6. The shift data on the image sensor 6 is used to measure the coordinates of the image height in the image stabilization processing (described later).

Next at step S804, the camera-system control circuit 5 causes the image processing circuit 7 to obtain a plurality of pieces of filter information according to imager stabilization from a plurality of pieces of filter information stored in the memory circuit 8. In this case, the image processing circuit 7 computes the relationship between the image height of the captured image captured at image stabilization processing and the image height obtained by the imaging optical system 3 at the no eccentric state on the basis of the shift data on the image sensor 6 under imager stabilization. The image processing circuit 7 selects a plurality of pieces of desired filter information from the filter information stored in the memory circuit 8 on the basis of the relationship between the image heights and the shooting conditions.

Next at step S805, the camera-system control circuit 5 obtains shift data on the image stabilizing lens group under lens stabilization during shooting on the basis of the shooting condition that lens stabilization and imager stabilization are used at the same time (determined at step S802). The obtained shift data includes the shift amount and the tilt amount of the image stabilizing lens group with respect to the optical axis 4 of the imaging optical system 3.

Next at step S806, the camera-system control circuit 5 causes the image processing circuit 7 to obtain a plurality of pieces of filter information based on lens stabilization from the filter information stored in the memory circuit 8. In this case, the image processing circuit 7 computes the amount and direction of eccentricity of the image stabilizing lens group with respect to the optical axis 4 of the imaging optical system on the basis of the shift data on the image stabilizing lens group. The image processing circuit 7 selects a plurality of pieces of desired filter information from the filter information stored in the memory circuit 8 on the basis of the amount and direction of eccentricity and the shooting condition.

Next at step S807, the camera-system control circuit 5 causes the image processing circuit 7 to compute the degrees of contribution of the correction amount (the amount of change in image height) at imager stabilization and the amount of eccentricity at lens stabilization to the amount of shift about the optical axis 4. In this case, the image processing circuit 7 computes the degrees of contribution to the amount of shift about the optical axis 4 of the imaging optical system 3 from the correction amount (the amount of change in image height) at imager stabilization and the amount of eccentricity (the amount of eccentricity and the direction of eccentricity) at lens stabilization. The image processing circuit 7 may compute the degrees of contribution of the amount and the direction of shift at imager stabilization and the amount and the direction of shift at lens stabilization to the amount of change in the PSF before and after the shift. The degrees of contribution computed at step S807 are used as the coefficients in convolution of a plurality of pieces of PSF information.

A method for computing the degrees of contribution will be described.

The amount of change in point spread function (PSF) is assumed as the amount of change in optical transfer function (MTF). The MTF changes when the image height changes due to imager stabilization. The amount of change in MTF at that time is referred to as a first change amount of the MTF. The MTF changes when eccentricity occurs due to lens stabilization. The amount of change in MTF at that time is referred to as a second change amount of the MTF. The degree of contribution is obtained from the ratio of the amount of change in the first MTF to the amount of change in the second MTF.

For example, if the original MTF has a value of 60%, and a change in image height changes the value of the MTF at the same evaluation image height to 50%, the first change amount of the MTF is 10 (=60−50). If the original MTF has a value of 60%, and a shift of the image stabilizing lens group changes the value of the MTF at the same evaluation image height to 40%, the second change amount of the MTF is 20 (=60−40). In this case, the PSF at imager stabilization and the PSF at lens stabilization make a contribution with a ratio of 1:2.

The direction of eccentricity at lens stabilization will be described. The MTF is improved or deteriorated depending on the direction of the eccentricity of the image stabilizing lens group. In many cases, the direction of the eccentricity of the image stabilizing lens group in which the MTF is improved, and the direction of the eccentricity of the image stabilizing lens in which the MTF is deteriorated are point-symmetrical about the optical axis 4. In this case, the degree of contribution of the PSF is changed so that a large correction is made in the direction in which the MTF is deteriorated, and a small correction is made in the direction in which the MTF is improved. However, if the MTF becomes lower than the original MTF in any direction after the image stabilizing lens group becomes eccentric, a correction is made to either image height.

For example, if the original MTF has a value of 60%, and the eccentricity of the image stabilizing lens group improves the value of the MTF to 70%, the second change amount of the MTF is −10 (=60-70). If the original MTF has a value of 60%, and the eccentricity of the image stabilizing lens group deteriorates the value of the MTF to 50%, the second change amount of the MTF is 10 (=60-50). Since the degree of contribution is proportional to the ratio, the PSF at lens stabilization when the value of the MTF is improved makes a contribution at a ratio at which the gain comes downs to 10/60, and the PSF at lens stabilization when the value of the MTF is deteriorated makes a contribution at a ratio at which the gain comes up to 10/60.

Next at step S808, the camera-system control circuit 5 causes the image processing circuit 7 to compute a PSF at a certain image height on the basis of the PSF of the filter information selected as described above. Specifically, the image processing circuit 7 multiplies the PSF selected according to the image height shifted by imager stabilization and the PSF selected according to the imaging optical system 3 that becomes eccentric by the shift of the image stabilizing lens group at lens stabilization by a coefficient and convolves them to compute the PSF at the image height.

Next at step S809, the camera-system control circuit 5 causes the image processing circuit 7 to create an image recovery filter. In this case, the image processing circuit 7 Fourier transforms the PSF calculated at step S808 to obtain an OTF and computes an image recovery filter, which is a function obtained by inversely Fourier transforming the OTF.

If at step S802 it is determined that lens stabilization and imager stabilization are not used at the same time, and the process goes to step S810, the camera-system control circuit 5 determines whether the image stabilization processing used is lens stabilization or imager stabilization.

Next at step S811, the camera-system control circuit 5 causes the image processing circuit 7 to obtain a plurality of pieces of filter information for use in the image stabilization processing detected at step S810. At that time, the image processing circuit 7 selects a plurality of pieces of filter information corresponding to the image stabilization processing detected at step S810 from the memory circuit 8. Thereafter, the camera-system control circuit 5 advances the process to step S809, and an image recovery filter is created as described above.

Thus, the image capturing apparatus 1 of the present embodiment stores only filter information that individually corresponds to non image stabilization, lens stabilization, and imager stabilization. The filter information is a plurality of pieces of filter information corresponding to image stabilization processing available for image capturing. In other words, since the image capturing apparatus 1 of the present embodiment does not have filter information ready for simultaneous use of lens stabilization and imager stabilization, an increase in data for the image recovery filter is suppressed. If lens stabilization and imager stabilization are used at the same time, using image recovery filters that are separately calculated from filter information for lens stabilization and filter information for imager stabilization would not provide a good correction of the degradation. For this reason, the present embodiment creates an image recovery filter ready for simultaneous use of lens stabilization and imager stabilization by performing predetermined computational processing based on the filter information stored in advance.

Specifically, when creating an image recovery filter suitable for simultaneous use of lens stabilization and imager stabilization, the image capturing apparatus 1 of the present embodiment obtains the amount of shift at lens stabilization and the amount of shift at imager stabilization. The image capturing apparatus 1 obtains filter information according to the condition on the image stabilization processing used in image capturing from a plurality of pieces of filter information stored in advance. In other words, the image capturing apparatus 1 obtains filter information that is stored for each of lens stabilization and imager stabilization. The image capturing apparatus 1 computes an image recovery filter for use in image recovery processing for simultaneous use of lens stabilization and imager stabilization by performing predetermined computational processing on the basis of the amount of shift at lens stabilization, the amount of shift at imager stabilization, and the filter information. The predetermined computational processing is an operation of multiplying the filter information obtained for each of lens stabilization and imager stabilization by a coefficient according to the degrees of contribution of the lens stabilization and the imager stabilization to the image stabilization processing and convolving them. The image capturing apparatus 1 of the present embodiment executes image recovery processing on a captured image captured by simultaneous use of lens stabilization and imager stabilization by using the created image recovery filter.

Thus, the image capturing apparatus 1 of the present embodiment creates an image recovery filter suitable for simultaneous use of two image stabilization processes of lens stabilization and imager stabilization. This allows the image capturing apparatus 1 of the present embodiment to perform high-accuracy image stabilization processing while reducing the amount of data to be stored in advance and high-accuracy image recovery processing on the degraded image after the image stabilization processing. In other words, the present embodiment reduces the amount of data by creating a PSF due to the eccentricity of the imaging optical system 3 in matrix in combination of the amount and direction of the eccentricity and storing the data discretely, that is, by storing the data while determining the accuracy at which an area without data is interpolated. Although in the above description the filter information to be stored is PSF information, this is given for mere illustrative purposes. The filter information may be any type of data that indicates OTF, wave front, optical transfer functions, such as MTF and PTF.

The image capturing apparatus of the present embodiment may be not only a digital camera with interchangeable lenses but also a digital camera with a lens fixed to the camera body, a video camera, an industrial camera, an in-vehicle camera, a medical camera, and other cameras.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-234938 filed Dec. 7, 2017 and No. 2018-205359 filed Oct. 31, 2018, which are hereby incorporated by reference herein in their entirety.

What is claimed is:

1. A method for image processing comprising:
obtaining filter information individually corresponding to two or more types of image stabilization processing used in shooting;
creating a correction filter by performing predetermined computational processing based on the filter information corresponding to the two or more types of image stabilization processing; and
performing correction processing using the correction filter on a captured image captured using the two or more types of image stabilization processing.

2. The method for image processing according to claim 1, wherein the filter information individually corresponding to the two or more types image stabilization processing used in shooting is obtained from a storage unit storing a plurality of pieces of filter information individually corresponding to a plurality of image stabilization processes available in shooting.

3. The method for image processing according to claim 1, wherein the two or more types of image stabilization processing comprise image stabilization processing for making a whole or part of an imaging optical system eccentric with respect to an optical axis of the imaging optical system.

4. The method for image processing according to claim 3, wherein the filter information comprises a point spread function in a state in which the whole or part of the imaging optical system is eccentric with respect to the optical axis of the imaging optical system when the image stabilization processing for making the whole or part of the imaging optical system eccentric is used, and
wherein the correction filter is created based on the obtained point spread function.

5. The method for image processing according to claim 1, wherein the two or more types of image stabilization processing comprise image stabilization processing for shifting an image sensor with respect to an optical axis of an imaging optical system.

6. The method for image processing according to claim 5, wherein the filter information comprises a point spread function in an image circle when the image stabilization processing for shifting the image sensor is performed, wherein the image circle is larger than an image circle corresponding to a state in which the image sensor is not eccentric with respect to the optical axis, and
wherein the correction filter is created based on the obtained point spread function.

7. The method for image processing according to claim 1, wherein the two or more types of image stabilization processing comprise:
image stabilization processing for making a whole or part of an imaging optical system eccentric with respect to an optical axis of the imaging optical system; and
image stabilization processing for shifting an image sensor with respect to the optical axis of the imaging optical system.

8. The method for image processing according to claim 7, wherein the filter information individually corresponding to two or more types of image stabilization processing comprises:
a first point spread function that is a point spread function in a state in which the whole or part of the imaging optical system is eccentric with respect to the optical axis of the imaging optical system when the image stabilization processing for making the whole or part of the imaging optical system eccentric is used; and
a second point spread function that is a point spread function in an image circle when the image stabilization processing for shifting the image sensor is performed, wherein the image circle is larger than an image circle corresponding to a state in which the image sensor is not eccentric with respect to the optical axis, and
wherein the correction filter is created based on the first and second point spread functions.

9. The method for image processing according to claim 8, further comprising:
calculating a coefficient based on a shift from a center of the optical axis of the imaging optical system for each of the first and second point spread functions,
wherein the correction filter is created by convolving the first and second point spread functions each multiplied by the coefficient.

10. The method for image processing according to claim 8, further comprising:
calculating a coefficient based on a change amount of the point spread functions before and after the shift from the center of the optical axis of the imaging optical system for each of the first and second point spread functions,
wherein the correction filter is created by convolving the first and second point spread functions each multiplied by the coefficient.

11. A computer-readable medium storing executable program instructions, which when executed by a computer, cause the computer to perform the method according to claim 1.

12. A method for image processing comprising:
obtaining a plurality of point spread functions individually corresponding to two or more types of image stabilization processing used in shooting;
calculating a second point spread function by convolving the plurality of point spread functions individually corresponding to the two or more types of image stabilization processing; and
performing correction processing using a correction filter created from the second point spread function on a captured image captured using the two or more types of image stabilization processing.

13. A computer-readable medium storing executable program instructions, which when executed by a computer, cause the computer to perform the method according to claim 12.

14. An image processing apparatus comprising:
a processor;

an operation circuit; and
a memory including instructions that, when executed by the processor, cause the processor to:
  obtain filter information individually corresponding to two or more types of image stabilization processing used in shooting;
  cause the operation circuit to perform predetermined computational processing based on the obtained filter information corresponding to the two or more types of image stabilization processing to create a correction filter; and
  cause the operation circuit to perform correction processing using the correction filter on a captured image captured using the two or more types of image stabilization processing.

15. An image processing apparatus comprising:
a processor;
an operation circuit; and
a memory including instructions that, when executed by the processor, cause the processor to:
  obtain a plurality of point spread functions individually corresponding to two or more types of image stabilization processing used in shooting;
  cause the operation circuit to calculate a second point spread function by convolving the plurality of point spread functions individually corresponding to the two or more types of image stabilization processing; and
  cause the operation circuit to perform correction processing using a correction filter created from the second point spread function on a captured image captured using the two or more types of image stabilization processing.

16. An image capturing apparatus comprising:
an image sensor;
a processor;
an operation circuit; and
a memory including instructions that, when executed by the processor, cause the processor to:
  obtain filter information individually corresponding to two or more types of image stabilization processing used in shooting using the image sensor;
  cause the operation circuit to perform predetermined computational processing based on the obtained filter information corresponding to the two or more types of image stabilization processing to create a correction filter; and
  cause the operation circuit to perform correction processing using the correction filter on a captured image created using the image sensor.

17. An image capturing apparatus comprising:
an image sensor;
a processor;
an operation circuit; and
a memory including instructions that, when executed by the processor, cause the processor to:
  obtain a plurality of point spread functions individually corresponding to two or more types of image stabilization processing used in shooting using the image sensor;
  cause the operation circuit to calculate a second point spread function by convolving the plurality of point spread functions individually corresponding to the two or more types of image stabilization processing; and
  cause the operation circuit to perform correction processing using a correction filter created from the second point spread function on a captured image created using the image sensor.

* * * * *